2,985,606
PLASTIC TILE MASTIC COMPOSITION

Robert F. Roecker, Pequea Township, Lancaster County, Pa., assignor to Armstrong Cork Company, Lancaster, Pa., a corporation of Pennsylvania No Drawing. Filed Jan. 12, 1959, Ser. No. 786,040

3 Claims. (Cl. 260—23)

This invention relates generally to adhesives and more particularly to an adhesive suitable for adhering plastic tile to a wall. Still more particularly the invention relates to a rubber-resin mastic for adhering plastic tile such as polystyrene tile permanently to a wall or other surface.

The adhesive used to adhere plastic tiles to a wall or other surface must possess a series of special properties. Among these are good aging properties, a short, buttery nature which allows the tile to be set without slipping, and a long open or application time. Of these, the aging property is probably the most important since one of the deficiencies of prior mastics has been the lack of adhesion and retaining tack behind the tile after several years' aging.

It is a primary object of the present invention to supply plastic tile adhesive having unusually excellent aging properties. It is another object of the present invention to supply an adhesive having a long open time and a short, buttery nature to prevent slippage of the tile as it is being set.

These objects have been achieved to a striking degree. The invention contemplates an adhesive comprising a 6-part composition. The first part is a rubber mixture made up of two rubbers. The first rubber is a rubbery butadiene-styrene-divinyl benzene terpolymer containing 20-25% by weight styrene and 0.5-2% by weight divinyl benzene. The other rubber is a natural thread reclaim rubber. The second part of the composition is a rosin ester having a melting point in the range 180°-230° F. The rosin ester is the reaction product of rosin acids and a polyhydroxy compound selected from the group consisting of glycerin and pentaerythritol. The third part is the zinc salt of rosin acids, the salt melting in the range 290°-315° F. The fourth part is the polymeric reaction product of tall oil fatty acids and dipentaerythritol; this reaction product is heavy-bodied and must have a viscosity of Z to Z7 on the Gardner-Holdt viscosity scale. The fifth part is the filler system. The fillers are selected from the group consisting of clays, silicon dioxide, and mixtures thereof. The sixth part is a rubber solvent to dissolve the above-described rubber mixture.

Use of the terpolymer described above is essential if the mastic is to have the requisite strength and working properties. The divinyl benzene in the terpolymer supplies cross-links to the more common butadiene-styrene copolymers, resulting in a short, buttery compound when put into solution.

The natural thread reclaim rubber, being cured and containing filler, imparts tack and stability to the entire composition. Virgin rubber is unsuitable since it gives too much stringiness and not as much strength as the natural thread reclaim. Other reclaims are unsuitable, and their use diminishes the strength, tack, and buttery nature of the final composition.

It is convenient to express the amounts of the various ingredients based on 100 parts by weight of the rubber mixture. The rubber mixture itself will contain 40-60 parts by weight of the terpolymer and, correspondingly, 60-40 parts by weight of the natural thread reclaim rubber. If the reclaim is used in amounts in excess of this amount, the composition will be insufficiently buttery, while if the reclaim is used in amounts less than the above-stated minimum, the composition will have insufficient tack and strength.

The rosin esters are prepared by esterifying the rosin acids such as those found in wood rosin with polyhydroxy compounds such as glycerin or pentaerythritol. The esters suitable for the present invention should melt in the range 180°-230° F. in order to impart the desirable properties to the final mastic. The rosin esters are used in an amount of 100-150 parts by weight per 100 parts by weight of the above-described rubber mixture. Amounts less than 100 parts by weight of rosin ester reduce the adhesion of the mastic to the tile, while amounts greater than 150 parts by weight produce a mastic which is weak and too stringy.

The zinc rosin salt is prepared by neutralizing rosin acids with a suitable zinc compound to produce the zinc salt of rosin acids. Melting point of the zinc salt should be in the range of 290°-315° F. The amount of the zinc salt to be used is in the range of 25-60 parts by weight per 100 parts by weight of the rubber mixture. Amounts greater than 60 parts by weight reduce the open time of the mastic, while amounts less than 25 parts by weight produce a mastic having poor stability and poor aging characteristics.

The tall oil esters used in the present composition are prepared by the reaction of tall oil fatty acids with dipentaerythritol; pentaerythritol will not produce an ester having a sufficiently high viscosity. Esterification of the tall oil fatty acids and the dipentaerythritol is carried out in known manner by admixing a slight excess (5%) dipentaerythritol with the tall oil fatty acids on a stoichiometric basis. A good procedure is to cook the mixture at a temperature of about 420°-450° F. to an acid number of 10, followed by a cook at about 575° F. for 12-15 hours to produce a viscosity in the range of Z to Z7 on the Gardner-Holdt viscosity scale.

The tall oil esters are used in an amount of 20-40 parts by weight per 100 parts by weight of the rubber mixture. If amounts less than 20 parts by weight are used, the mastic has insufficient tack. If amounts greater than 40 parts by weight are used, the mastic is too soft.

The fillers to be used in the mastic must have a fairly high absorption-of-oil property. This excludes such fillers as calcium carbonate. Fillers meeting the requirements are the clays, particularly the kaolins, and finely-divided silicon dioxide. Preferably a mixture of clays and silicon dioxide will be used. The amount of the fillers will be 200-300 parts by weight based on 100 parts by weight of the rubber mixture. If less than 200 parts by weight fillers are used, the mastic lacks strength, while if more than 300 parts by weight are used, the mastic does not possess sufficient tack and is too dry. The filler system may also include inorganic fibrous filler to impart additional strength to the mastic. The fibers should be short. A good ratio of fillers will be about 67% by weight clays, the remaining 33% being divided between silicon dioxide and short-fiber filler such as asbestine.

A solvent for the rubber must be included in the mastic. The solvent can be any of the known naphtha fractions or other liquid hydrocarbon mixtures normally used for dissolving rubbers, particularly those boiling in the range 140°–215° F. Generally speaking the amount of solvent to be used will be from 150–250 parts by weight per 100 parts by weight of the rubber mixture. The amount can vary considerably depending on the use to which the mastic will be put. Where a thick, heavy polystyrene tile is to be used, smaller amounts of good rubber solvents are acceptable. However, where the mastic is used on very thin polystyrene tile or on polystyrene foam, then milder solvents (kauri butanol value of 23–28) may be called for in order that the solvents do not adversely affect the thin, polystyrene sections.

Additional ingredients may be added to the mastic in order to round out its properties. These ingredients are not critical to the invention, but they are preferably used in order to impart incremental improvements to the mastic. For example, small amounts of alcohol—a denatured ethyl alcohol—are known to stabilize rubber-resin systems. The alcohol is generally used in the range of about 20–30 parts by weight per 100 parts by weight of the rubber mixture. Small amounts of water can be used to shorten the system; these generally run 2–5 parts by weight water per 100 parts by weight of the rubber mixture. Wetting agents may be added in small amount, generally 1–8 parts by weight per 100 parts by weight of the rubber mixture. Antioxidants to prevent undue oxidation of the rubbers and the tall oil fatty acid esters may be added in small amounts such as 1–4 parts by weight per 100 parts by weight of the rubber mixture. Pigments in suitable amount can be added to impart a pleasant appearance to the finished mastic.

The mastic is prepared by breaking down the rubbers on a mill. The rubbers are transferred to an internal mixer and the resins and fillers added. After proper dispersion the solvents are added until the required viscosity is obtained.

A tile mastic according to the present invention has an open or application time of up to four hours. The adhesive has an excellent short, buttery nature which enables one to place tile against a film of the adhesive without fear of any slipping of the tile. Additionally, the mastic has unusually excellent adhesion and tack behind plastic tile after aging of more than one year. The most pronounced problem in this field has been the lack of an adhesive which would rigidly adhere a polystyrene tile to a wall in an installation such as a bathroom. Until the advent of the present mastic, no nonglazing, strong adhesive had been found.

The following example illustrates an embodiment of the invention. All parts are by weight unless otherwise stated.

*Example*

The following formulation was prepared:

| Ingredients | Parts |
|---|---|
| Butadiene-styrene-divinyl benzene terpolymer containing 23% by weight styrene and 1.5% by weight divinyl benzene (FR-S1099) | 55.55 |
| Natural thread reclaim rubber (Muhelstein F-4330, identification number) | 44.45 |
| Pentaerythritol ester of isomerized rosin acids (Iso Ester C) | 113.00 |
| Zinc salt of rosin acids (Zirex) | 26.04 |
| Dipentaerythritol ester of tall oil fatty acids; Z-7 viscosity, Gardner-Holdt | 31.24 |
| Asbestine, 5X | 34.72 |
| Pigment, Titanium Dioxide | 17.36 |
| Clay (ASP200) | 175.00 |
| Oleic Acid (Wetting Agent) | 4.17 |
| Di-Tertiary butyl para-cresol (antioxidant) | 2.77 |
| Silicon dioxide, fine particle (Hi-Sil) | 34.72 |
| Naphtha fraction (VM & P Naphtha) | 86.80 |
| Denatured alcohol | 26.04 |
| Water | 3.80 |
| Naphtha solvent (Benzosol) | 98.00 |

The above composition was blended into a mastic by milling the terpolymer rubber and reclaim together until thoroughly broken down. The sheeted rubber was then added to an internal mixer and the resins added, followed by the fillers, wetting agent and antioxidant. After thorough dispersion, 15 to 20 minutes' intensive mixing, the solvents were added at a rate which will not cause breaking up of the batch. The batch is then discharged.

Test installations made with this mastic showed that it had a four-hour open time, prevented tile from slipping during installation, and yielded a firm bond both to the wall and to polystyrene tile after one year of installation.

I claim:

1. A plastic tile adhesive comprising relative proportions of (1) 100 parts by weight of a rubber mixture, said mixture comprising 40–60 parts by weight of a rubbery butadiene-styrene-divinyl benzene terpolymer containing 20–25% by weight of styrene and 0.5–2% by weight divinyl benzene, and 60–40 parts by weight of natural thread reclaim rubber, (2) 100–150 parts by weight of a rosin ester melting in the range 180°–230° F., which is the reaction product of rosin acids and a polyhydroxy compound selected from the group consisting of glycerin and pentaerythritol, (3) 25–60 parts by weight of a zinc salt of rosin acids melting in the range 290°–315° F., (4) 20–40 parts by weight of the polymeric reaction product of tall oil fatty acids and dipentaerythritol having a viscosity of Z to Z7 on the Gardner-Holdt viscosity scale, (5) 200–300 parts by weight of inorganic filler selected from the group consisting of clays, finely-divided silicon dioxide, and mixtures thereof, and (6) sufficient rubber solvent to dissolve said rubber mixture.

2. A composition according to claim 1 wherein said polymeric reaction product of tall oil fatty acids and dipentaerythritol has a viscosity of Z7 on the Gardner-Holt viscosity scale.

3. A composition according to claim 1 wherein said inorganic filler is a mixture of a clay and silicon dioxide and contains about 60–70% by weight clay.

References Cited in the file of this patent

UNITED STATES PATENTS

| | | |
|---|---|---|
| 2,367,629 | Teppema | Jan. 16, 1945 |
| 2,407,038 | Stamberger | Sept. 3, 1946 |
| 2,451,865 | O'Brien | Oct. 19, 1948 |
| 2,498,338 | Martin | Feb. 21, 1950 |